United States Patent [19]
Kato et al.

[11] Patent Number: 5,276,578
[45] Date of Patent: Jan. 4, 1994

[54] MAGNETIC HEAD HAVING A PAIR OF FRONT CORE ASSEMBLIES

[75] Inventors: Minoru Kato, Chichibu; Koichi Hara, Arakawa; Mutsuhiro Yamada, Chichibu, all of Japan

[73] Assignee: Canon Denshi Kabushiki Kaisha, Saitama, Japan

[21] Appl. No.: 669,078

[22] Filed: Mar. 12, 1991

Related U.S. Application Data

[63] Continuation-in-part of Ser. No. 557,770, Jul. 26, 1990, Pat. No. 5,148,342.

[30] Foreign Application Priority Data

Mar. 13, 1990 [JP] Japan ................................ 2-63893
Feb. 19, 1991 [JP] Japan ................................ 3-023644

[51] Int. Cl.⁵ ........................ G11B 5/187; G11B 5/147
[52] U.S. Cl. ........................ 360/122; 360/121; 360/125
[58] Field of Search ............ 360/121, 122, 125, 127, 360/126

[56] References Cited

U.S. PATENT DOCUMENTS

| | | | |
|---|---|---|---|
| 4,750,071 | 6/1988 | Kato et al. | 360/124 |
| 4,839,763 | 6/1989 | Matsuzawa | 360/126 |
| 5,148,342 | 9/1992 | Kato | 360/121 |

FOREIGN PATENT DOCUMENTS 60-201515 10/1985 Japan.
62-246112 10/1987 Japan.
2-49207 2/1990 Japan.

Primary Examiner—John H. Wolff
Attorney, Agent, or Firm—Spencer, Frank & Schneider

[57] ABSTRACT

A high magnetic head for floppy disk drives that can prevent crosstalk between magnetic cores. Two nonmagnetic material pieces are joined with two magnetic material pieces, respectively, and track grooves and a winding groove are formed on a surface of each of the two magnetic material pieces. The nonmagnetic material pieces are joined together to form a core block with those surfaces facing each other on which the grooves are formed. The core block is cut to a plurality of front core assemblies. The core assembly includes a magnetic circuit having a magnetic gap, and nonmagnetic spacer members which do not form a magnetic circuit, thereby preventing crosstalk between the magnetic cores constituting the composite type magnetic head.

4 Claims, 19 Drawing Sheets

MAGNETIC HEAD HAVING A PAIR OF FRONT CORE ASSEMBLIES

CROSS-REFERENCE TO RELATED APPLICATIONS

This application is a continuation in part of application Ser. No. 07/557,770, filed Jul. 26, 1990, now U.S. Pat. No. 5,148,342.

BACKGROUND OF THE INVENTION

1. Field of the Invention

The present invention relates to a magnetic head on which a magnetic recording medium slides so as to record and reproduce information, and to a method for manufacturing such a head. In particular, the invention relates to a magnetic head for floppy disk drives that can perform recording and reproduction on a floppy disk, a flexible disk-like magnetic medium, and to a method suitable for manufacturing such a head.

2. Description of the Prior Art

As an example of such a magnetic head, a conventional magnetic head having the structure shown in FIGS. 1-3 will be explained: it performs recording and reproduction to and from a floppy disk by a so-called tunnel erasing method.

FIG. 1 is a perspective view showing the construction of the main body of the magnetic head. In FIG. 1, reference numeral 1 designates a front core assembly. It is integrally constructed by coupling, via a spacer 6, the front core portions of a recording and reproducing magnetic core 2 and an erasing magnetic core 4 for performing the tunnel erasing.

The recording and reproducing core 2 is constructed by joining a T-shaped front core 2a and an I-shaped front core 2b via a recording and reproducing gap 3, and by further joining a back core 15 to the bottom ends of the front cores 2a and 2b. Likewise, the erasing core 4 is constructed by joining a T-shaped front core 4a and an I-shaped front core 4b via erasing gaps 5 and 5', and by further joining a back core 16 to the bottom ends of the front cores 4a and 4b. The front core portions of the recording and reproducing core 2 and erasing core 4 are coupled via the spacer 6 so as to form the front core assembly 1, followed by the bonding of nonmagnetic sliders 7 and 8 to both sides thereof by an adhesion or glass welding process before the back cores 15 and 16 are joined.

The sliders 7 and 8 slide on a magnetic disk along with the cores 2 and 4 so as to stabilize the sliding of the cores 2 and 4 and to protect them. The sliders 7 and 8 are made of ceramics, and have notches 7b and 8b, thus taking block-like shapes having L-like cross sections, respectively, and are joined to opposite sides of the front core assembly 1 at junction surfaces 7a and 8a which are formed as remainders of the notches.

After the sliders are attached, a coil bobbin 9 on which a recording and reproducing coil 10 is wound, and a coil bobbin 12 on which an erasing coil 13 is wound are mounted on the front cores 2a and 4a of the front core assembly 1, respectively. Subsequently, the back cores 15 and 16 which are coupled via a spacer 17 are joined to the ends of legs of the front cores 2a, 2b, 4a and 4b to form a magnetic head main body 18 as shown in FIG. 2.

Then, as shown in FIG. 2, the magnetic head main body 18 is fixed on a support plate 19, and coil ends 10a and 13a of the coils 10 and 13 are connected to a flexible printed board 20 attached to the support plate 19. Thus, a magnetic head 21 is constructed.

The magnetic head 21 thus constructed is mounted on a head carriage in a floppy disk drive by fixing the support plate 19 thereon. Thus, the top surfaces of the front core assembly 1 and sliders 7 and 8 in FIGS. 1 and 2 comprise a disk sliding surface that slides on a disk, thereby performing recording by the tunnel erasing method as shown in FIG. 3.

The tunnel erasing method forms a data track 22 as follows: first, data are recorded by the recording and reproducing gap 3 on the magnetic disk which slides in the direction of the arrow A in FIG. 3; and then, both sides of the data are erased by the erasing gaps 5 and 5'.

Recently, large capacity floppy disk drives have been developed: even floppy disk drives having a capacity above 10 MB (Mega-Bits) have been produced. The large capacity is achieved by increasing the line recording density and track density. Current floppy disk drives having 1-2 MB capacity have a maximum line recording density of 9.7 KBPI, and a track density of 135 TPI. To achieve a capacity above 10 MB, a line recording density and a track density of three to four times are required: a maximum line recording density above 35 KBPI and a track density of 405 TPI are necessary.

To increase the track density, a servo-signal type recording head in conjunction with a servo-signal type disk on which servo-signals have been previously recorded is used in place of the tunnel erasing type magnetic head 21 as shown in FIGS. 1 and 2.

FIG. 4 is a schematic plan view showing the state of recording on a magnetic disk by using the servo-signal method. The track positioning is carried out based on servo-signals 24 previously written on the magnetic disk, and a data track 22 is formed by writing data with a magnetic head which includes a recording and reproducing core 40 having only one recording and reproducing gap 26. Such a servo-signal type recording head is used in a floppy disk drive of a capacity above 200 TPI.

Here, it must be taken into consideration that compatibility between higher level and lower level machines must be maintained in general use of floppy disk drives. For example, a 3.5 inch, 2 MB machine has read/write compatibility with a 1 MB machine so that the reading and writing of 1 MB can be accomplished. Likewise, a 4 MB machine has read/write compatibility with 1 MB and 2 MB machines. These machines share the same track density of 135 TPI so that the read/write compatibility can be maintained. In contrast with this, when the track densities differ from each other, although the reading of the data of lower track density is possible, the writing thereof is impossible. Thus, the compatibility of programs and data is lost.

To meet the requirement for the compatibility between the machines of different track density, a composite type magnetic head is proposed which includes a magnetic core for the tunnel erasing type and a magnetic core for a servo-signal type which are disposed in parallel in the lateral direction of a track. The structure thereof will be described with reference to FIGS. 5 and 6. In these figures, like or corresponding parts to those of FIGS. 1 and 2 are denoted by the same reference numerals, and the explanation thereof is omitted here.

FIG. 5 is an exploded perspective view showing the construction of a magnetic head main body of this type.

A recording and reproducing core 2 and an erasing core 4 of the tunnel erasing type are arranged by a front core assembly 1 and back cores 15 and 16 in a manner similar to those in FIGS. 1 and 2. Both the cores 2 and 4 are arranged, for example, for a 135 TPI track density. They differ from those in FIGS. 1 and 2 in that the coil bobbin 12 of the erasing core 4 is mounted on a back core 16. For this purpose, the back core 16 is elongated and the front core 4a is shaped like the letter L.

Reference numeral 40 denotes a recording and reproducing core of the servo-signal type, which is arranged as a core for a high track density of 405 TPI or 540 TPI, for example. The recording and reproducing core 40 is completed by joining a back core 29 to the bottom ends of a front core assembly 25 which is constituted by coupling an L-shaped front core 25a and a T-shaped front core 25b via a recording and reproducing gap 26. Then, a bobbin 27 on which a coil 28 is wound is mounted on the front core 25b.

In the assembly process of a magnetic head main body 31 shown in FIG. 6, the core assemblies 1 and 25 are joined by adhesion via a spacer 30 made of a nonmagnetic ferrite or ceramic. The spacer 30 is formed as a thin rectangle corresponding to the top portions of the front core assemblies 1 and 25. The spacer 30 may be constructed by sandwiching a magnetic material by nonmagnetic materials. Then, sliders 7 and 8 are attached to both sides of the front core assemblies 1 and 25.

Subsequently, coil bobbins 9 and 27 are mounted on the front cores 2a and 25b, and then, a coil bobbin 12 of a coil 13 is mounted on a back core 16 which has been coupled with a back core 15 via a spacer 17. After that, the back cores 15 and 16 are joined to the front cores 2a, 2b, 4a and 4b, and a back core 29 is joined to the front cores 25a and 25b. Thus, the magnetic head main body 31 of FIG. 6 is constructed.

Then, as shown in FIG. 7, the magnetic head main body 31 is fixed on a support plate 19 made from a stainless steel or beryllium bronze, and coil ends 10a, 13a and 28a of coils 10, 13 and 28 are connected to a flexible printed board 20 attached to the support plate 19. Thus, a magnetic head 35 is constructed.

When the recording or reproduction is carried out on a magnetic disk by using the magnetic head 31, the read/write compatibility between higher and lower level machines becomes possible by correctly selecting either the recording and reproducing core 2 and erasing core 4 of the front core assembly 1, or the recording and reproducing core 40 of the front core assembly 25 in accordance with the track density.

The conventional composite type magnetic head 31, however, has a problem of crosstalk which is induced by magnetic leakage between the front core assemblies 1 and 25, because they are disposed in close vicinity via the spacer 30 as shown in FIGS. 5 and 6.

For example, consider the case where a higher density disk (for example, 405 TPI servo-signal type) is replayed by a higher level floppy disk drive. In this case, the reproduction of the higher density disk is carried out by the recording and reproducing gap 26 of the front core assembly 25. At the same time, however, the recording and reproducing gap 3 of the front core assembly 1 which is provided for a lower density disk (for example, 135 TPI tunnel erasing type) and is placed in close proximity of the front core assembly 25 will reproduce a plurality of tracks of the higher density disk. This will cause the flux through the front core assembly 1 to leak into the front core assembly 25, thereby inducing crosstalk.

The crosstalk thus induced will degrade the reliability of the read data, and presents an important problem in constructing floppy disk drives. In addition, once crosstalk takes place, the core efficiency during the recording or reproduction reduces. This will results in an increase in current to be applied to the coil 28 to carry out sufficient recording, a decrease in the margin of the reproduced signal, or a decrease in resistance against noise, which requires a change of circuitry of the floppy disk drive or the design modification thereof.

SUMMARY OF THE INVENTION

Accordingly, it is an object of the present invention to provide a magnetic head that can effectively prevent crosstalk, and a method for manufacturing such a head at low cost.

According to a first aspect of the present invention, there is provided a magnetic head comprising:

a pair of front core assemblies each of which has one or more magnetic cores forming a magnetic circuit in which a magnetic gap is formed;

a spacer plate sandwiched by the front core assemblies; and a sliding surface on which a magnetic recording medium slides, and which includes the magnetic gap of each of the front core assemblies;

wherein at least one of the magnetic cores comprises one or more nonmagnetic spacer members which are disposed outside the magnetic circuit, and constitute a part of the sliding surface.

Here, at least one of the magnetic cores may comprise a pair of front cores and a back core, and each of the front cores may comprise a beam member constituting the sliding surface and leg members to which the back core is joined to form the magnetic circuit, and the nonmagnetic spacer members constitute portions of the beam member.

The beam member may have thin notches formed on the nonmagnetic spacer members, thereby the nonmagnetic spacer members have thin space with the magnetic medium when the magnetic head slides on the magnetic recording medium.

According to a second aspect of the present invention, there is provided a method for manufacturing a magnetic head having a front core assembly which includes two front cores coupled together via a magnetic gap, and nonmagnetic spacer members which are made from a nonmagnetic material and are fixed to both sides of the front cores, the front cores and nonmagnetic spacer members being aligned in the direction in which a sliding surface of the magnetic head slides on a magnetic recording medium, the method comprising the steps of:

forming a pair of magnetic material pieces which are starting materials of a plurality of the front cores;

forming a groove on a surface of each of the magnetic material pieces;

embedding a nonmagnetic material for forming the nonmagnetic spacer members in each of the groove of the magnetic material pieces;

forming on anther surface of each of the magnetic material pieces a plurality of track grooves at a predetermined interval that define a track width of the magnetic head;

forming on the surface, on which the track grooves are formed, of one of the magnetic material pieces a winding groove on which a coil of the magnetic head is to be wound;

joining, after completing the above steps, the two magnetic material pieces together with butting the surfaces on which the track grooves are formed; and cutting the magnetic material pieces joined together into a plurality of the front core assemblies.

According to a third aspect of the present invention, there is provided a method for manufacturing a magnetic head having a front core assembly which includes two front cores coupled together via a magnetic gap, and nonmagnetic spacer members which are made from a nonmagnetic material and are fixed to both sides of the front cores, the front cores and nonmagnetic spacer members being aligned in the direction in which a sliding surface of the magnetic head slides on a magnetic recording medium, the method comprising the steps of:

forming a pair of magnetic material pieces which are starting materials of a plurality of the front cores;

forming on a surface of each of the magnetic material pieces a plurality of track grooves at a predetermined interval that define a track width of the magnetic head;

forming on the surface, on which the track grooves are formed, of one of the magnetic material pieces a winding groove on which a coil of the magnetic head is to be wound;

joining, after completing the above steps, the two magnetic material pieces together with butting the surfaces on which the track grooves are formed;

fastening, on both outer side surfaces opposite the butt surfaces of the magnetic material pieces, nonmagnetic material pieces which are starting materials of the plurality of nonmagnetic spacer members in such a manner that the magnetic material pieces and the nonmagnetic material pieces have a substantially coplanar surface to form an assembly of the magnetic material pieces and the nonmagnetic material pieces, and cutting the assembly of the magnetic material pieces and nonmagnetic material pieces into a plurality of the front core assemblies.

Here, the substantially coplanar surface may have thin notches on the nonmagnetic material surfaces, thereby the nonmagnetic spacer members have thin space with the magnetic medium when the magnetic head slides on the magnetic medium.

According to the fourth aspect of the present invention, a method for manufacturing a magnetic head having a front core assembly which includes two front cores coupled together via a magnetic gap, and nonmagnetic spacer members which are made from a nonmagnetic material and are fixed to both sides of the front cores, the front cores and nonmagnetic spacer members being aligned in the direction in which a sliding surface of the magnetic head slides on a magnetic recording medium, the method comprising the steps of:

forming a pair of core boards each of which is composed of a magnetic material board and nonmagnetic material board joined together, and which are starting materials of a plurality of the front cores;

forming on a surface of each of the core boards a plurality of track grooves at a predetermined interval that define a track width of the magnetic head;

forming on the surface, on which the track grooves are formed, of one of the core boards a winding groove on which a coil of the magnetic head is to be wound;

joining, after completing the above steps, the two core boards together with butting the surfaces on which the track grooves are formed; and cutting the core boards joined together into a plurality of the front core assemblies.

According to the first aspect of the present invention, the nonmagnetic spacer member can reduce the facing area between the two front core assemblies, thereby decreasing crosstalk between the magnetic cores of the two front core assemblies.

According to the second, third and fourth aspects of the present invention, a number of front core assemblies that can be used as a part of the composite type magnetic head for a floppy disk drive, and that can reduce crosstalk can be produced at the same time from the two magnetic material pieces in which the nonmagnetic spacer member is embedded, or from the two magnetic material pieces and the nonmagnetic material pieces.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
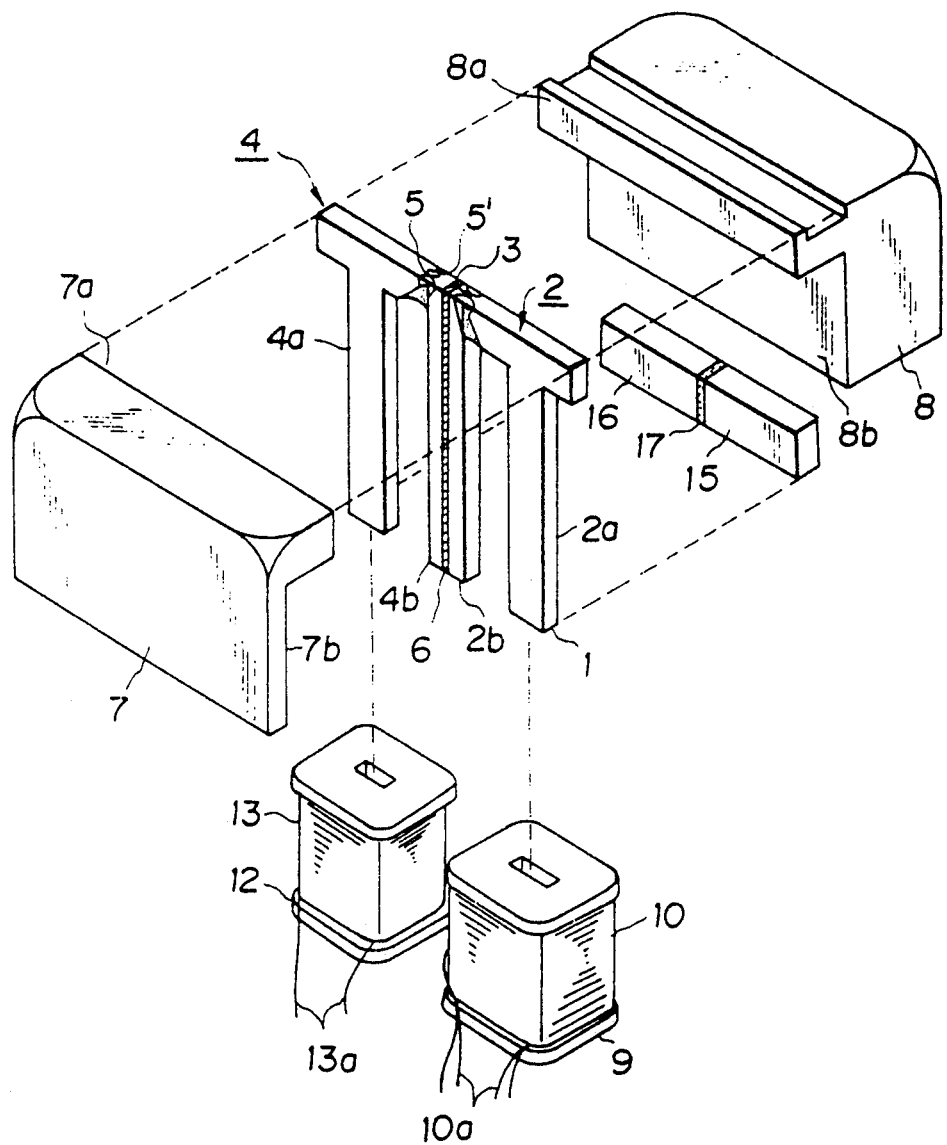
FIG. 1 is an exploded perspective view showing the construction of a conventional magnetic head main body.
Figure 2:
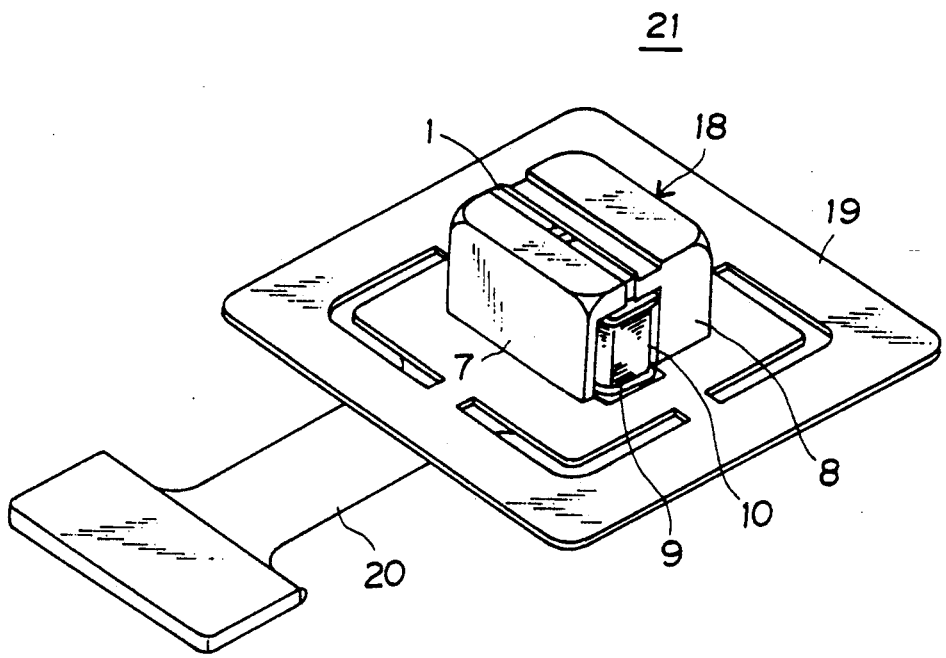
FIG. 2 is a perspective view showing the arrangement of the conventional magnetic head including the magnetic head main body.
Figure 3:
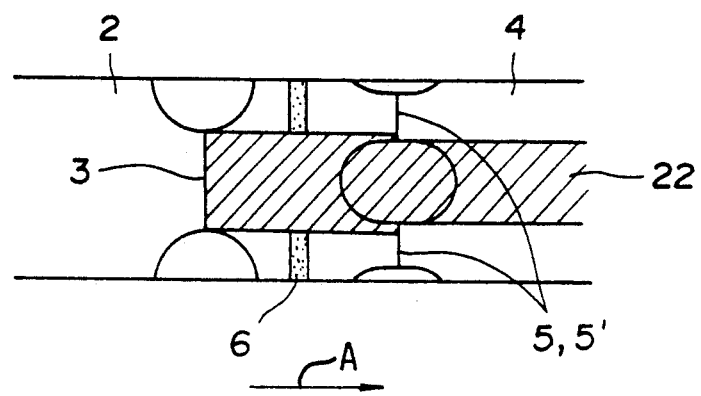
FIG. 3 is a schematic plan view illustrating the tunnel erasing method as an example of the recording method of a floppy disk drive.
Figure 4:
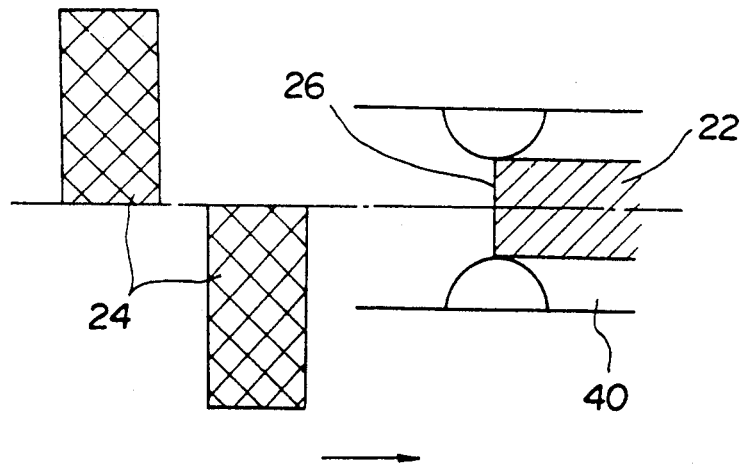
FIG. 4 is a schematic plan view illustrating the state of recording on a magnetic disk by using the servo-signal method.

The invention will now be described with reference to the accompanying drawings. Here, a composite type magnetic head for floppy disk drives and method for manufacturing thereof is exemplified. In the following figures, like parts are designated by the same reference numerals as those in FIGS. 1–7 which are previously described as prior art, and the description thereof will be omitted.

EMBODIMENT 1

Figure 8:
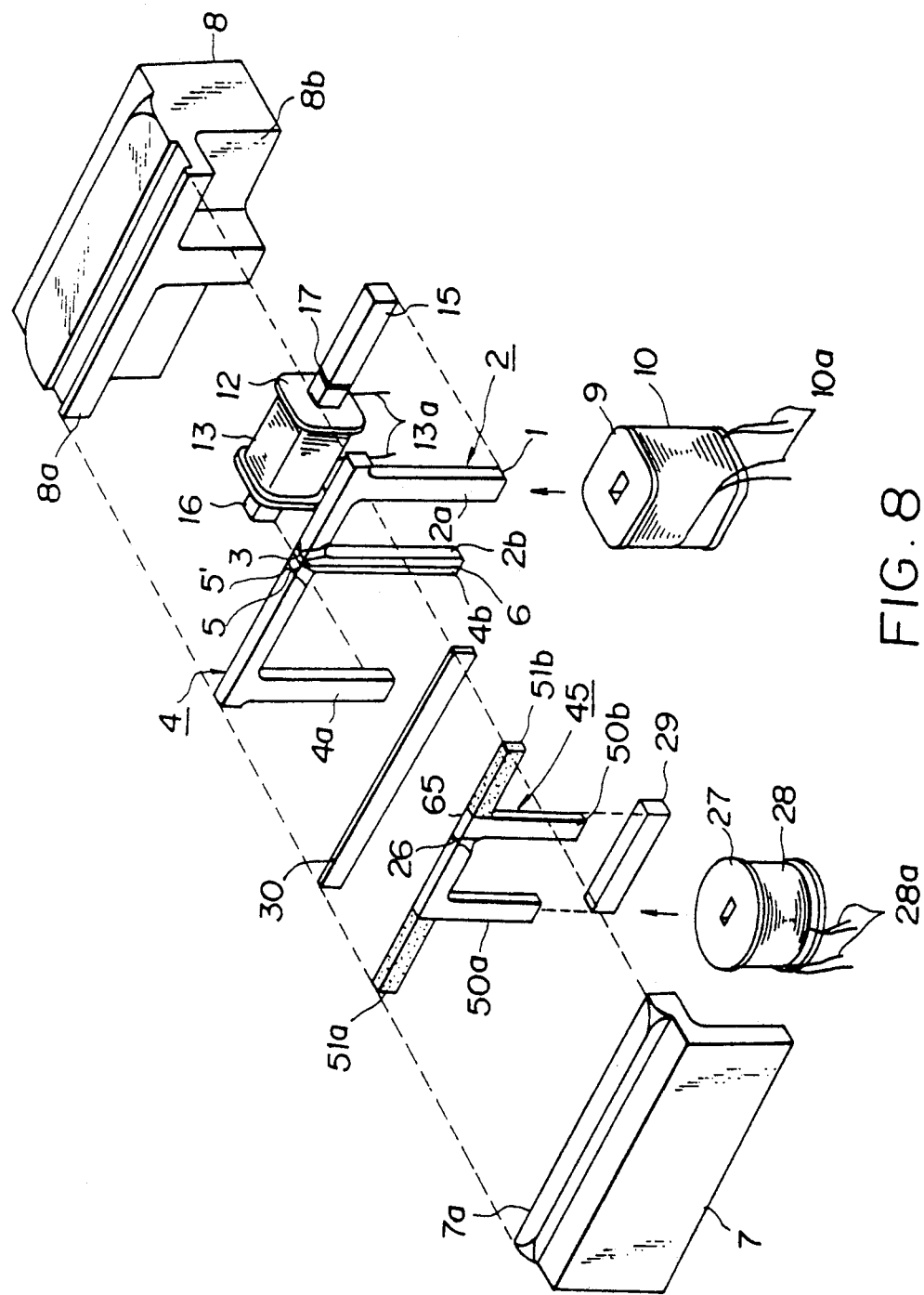
FIG. 8 is an exploded perspective view showing the construction of a composite type magnetic head main body for floppy disk drives fabricated by the method of a first or second embodiment of the present invention.
Figure 9:
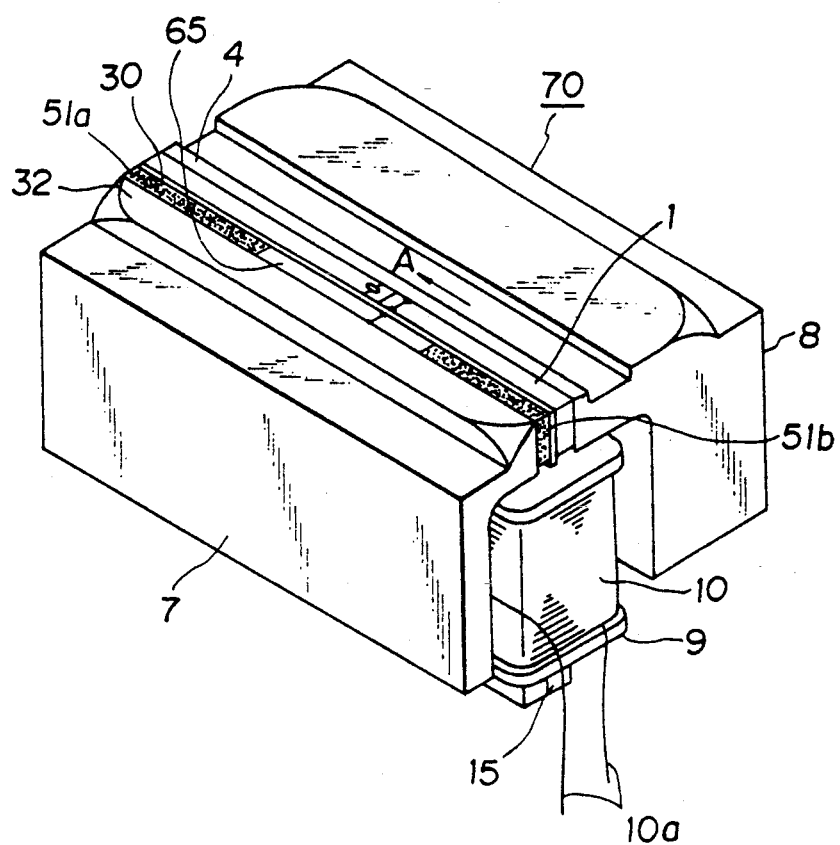
FIG. 9 is a perspective view showing the appearance of the composite type magnetic head main body for floppy disk drives fabricated by the method of the first or second embodiment of the present invention.

FIGS. 8 and 9 are perspective views showing the construction of the main body of a composite type magnetic head for floppy disk drives fabricated by the method of a first embodiment of the present invention. The magnetic head main body shown in FIGS. 8 and 9 differs from that shown in FIGS. 5 and 6 in that the front core assembly 65 constituting a servo-signal type recording and reproducing core 45 has a different structure from the front core assembly 25.

This will be described in more detail. The conventional front core assembly 25 is arranged by joining the thin-platelike L-shaped front core 25a and T-shaped front core 25b via the recording and reproducing gap 26. The top portion of the assembly 25, which slides on a magnetic disk in the direction of the arrow A in FIG. 6, has the same length in that direction as that of the front core assembly 1 including the recording and reproducing core 2 and the erasing core 4 of the tunnel erasing type.

In contrast with this, the front core assembly 65 of the present embodiment is arranged by joining a thin-plate-like L-shaped front core 50a and I-shaped front core 50b via a recording and reproducing gap 26, and the top portion of the cores 50a and 50b, which slides on a magnetic disk in the direction of the arrow A in FIG. 9, has a substantially shorter length in that direction than that of the front core assembly 1.

In addition, outside the top portion of the cores 50a and 50b, spacers 51a and 51b made of nonmagnetic material are fixed at both ends in the sliding direction of the front core assembly 65. The spacers 51a and 51b are formed in a rectangular thin-plate-like shape, and are fixed in the sliding direction to the cores 50a and 50b in such a manner that the top surfaces thereof become coplanar, thereby making the disk sliding surface. Thus, the length of the front core assembly 65 in the sliding direction of a disk, including the spacers 51a and 51b, is equal to that of the front core assembly 1.

Next, the fabrication process of the core assembly 65 will be described with reference to FIGS. 10A–10H. FIGS. 10A–10H are perspective views illustrating the fabrication steps of the servo-signal type front core assembly 65 which is used to form the composite type magnetic head of the present invention.

Figure 10A:
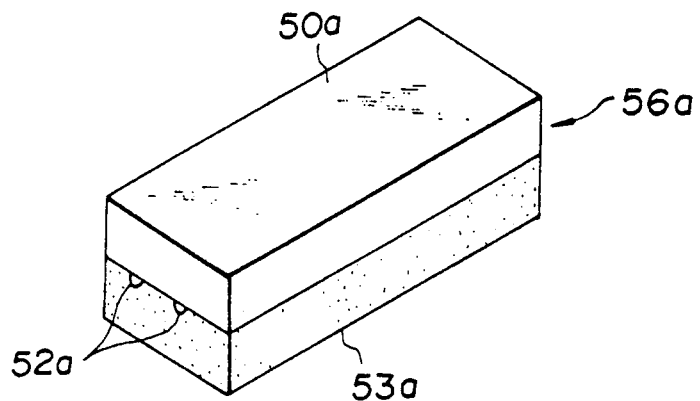
FIGS. 10A-10H are perspective views illustrating the fabrication steps of the servo-signal type front core assembly 65 which is used to form the composite type magnetic head.

As shown in FIG. 10A, a magnetic material board 50a made from a high-permeability magnetic material like a ferrite is joined to a nonmagnetic material board 53a made from a nonmagnetic material such as a ceramic or nonmagnetic ferrite by a joint material 52a such as a glass thereby forming a core board 56a.

The joint materials 52a are either disposed in a plurality of grooves which are formed on at least one of the magnetic material board 50a and the nonmagnetic material board 53a in the direction perpendicular to track grooves 54, or poured between the magnetic material board 50a and the nonmagnetic material board 53a which are spaced a predetermined length apart.

Figure 10B:
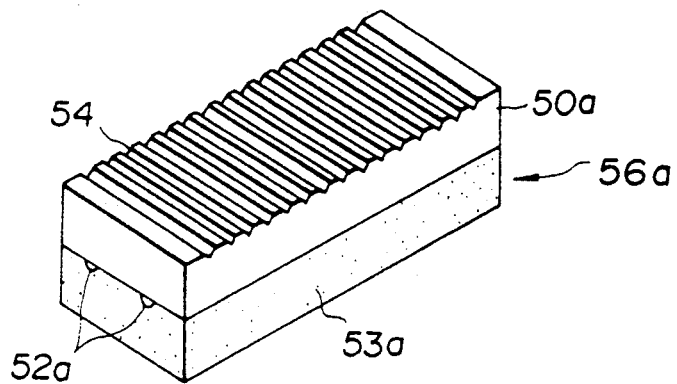
Figure 10C:
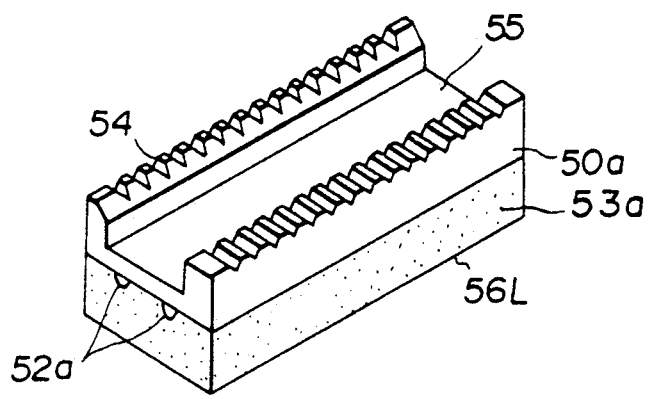

Next, a plurality of track grooves 54 are formed which define the track width of the recording and reproducing tracks as shown in FIG. 10B, and then, a winding groove 55 perpendicular to the track grooves 54 is formed, thereby forming an L core block 56L.

Figure 10D:
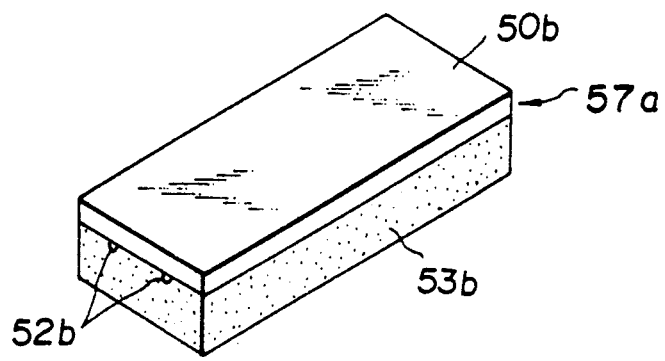
Figure 10E:
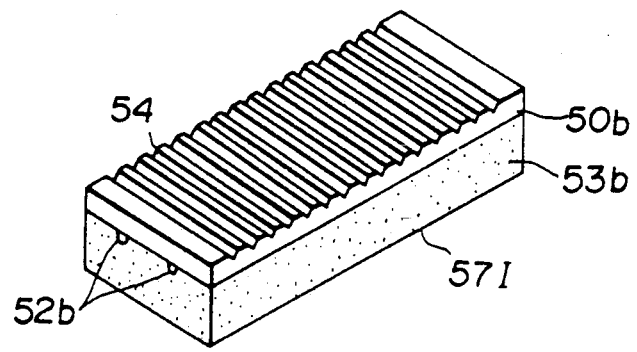

Meanwhile, as shown in FIG. 10D, a magnetic material board 50b and a nonmagnetic material board 53b which have different thicknesses from those shown in FIGS. 10A are joined together with a joint materials 52b to form a core board 57a. Subsequently, a plurality of track grooves 54 which define the track width are formed on the core board 57a, thus forming an I core block 57I as shown in FIG. 10E.

Figure 10F:
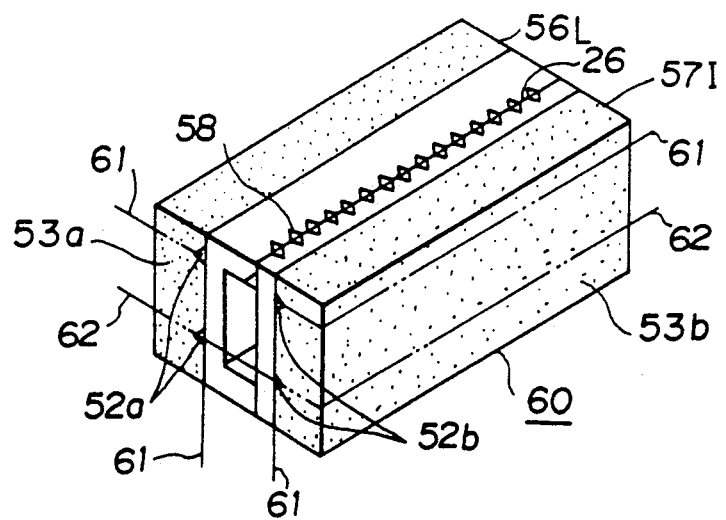
Figure 10G:
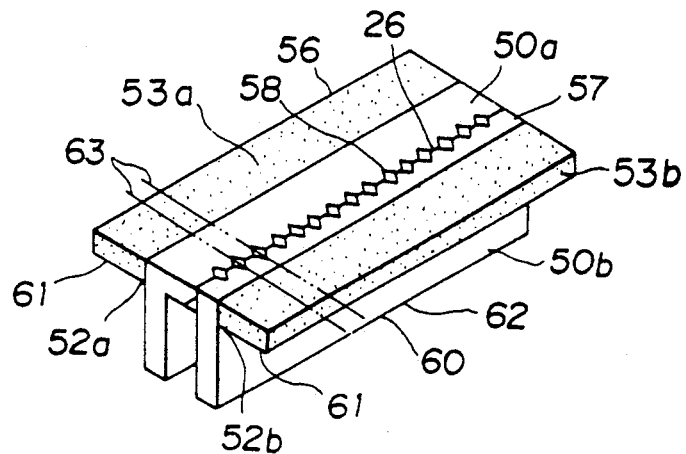
Figure 10H:
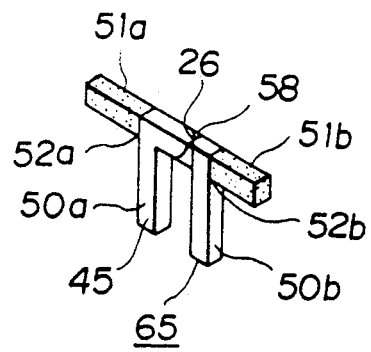

After that, by using a thin film formation technique such as sputtering or vapor deposition, films of predetermined thicknesses which are made from a high saturation flux density material such as Fe-Al-Si alloys are formed on the butt surfaces of the L and I core blocks 57L and 57I as needed, that is, on the surfaces on which grooves have been formed. Subsequently, nonmagnetic thin films made from a nonmagnetic material such as $SiO_2$ and $CrO_2$ are formed on the previously formed films to form the recording and reproducing gap 26. After that, the L-core block 56L and the I-core block 57I are butted as shown in FIG. 10F so as to align the track grooves, and are joined together by a joint material 58 whose melting point is lower than that of the joint materials 52a and 52b, thereby forming a core block 60. The core block 60 is cut along cutting lines 61 and 62 to a shape shown in FIG. 10G, and finally, it is cut along cutting lines 63, and is subjected to lapping so as to form individual front core assemblies 65 as shown in FIG. 10H.

Figure 5:
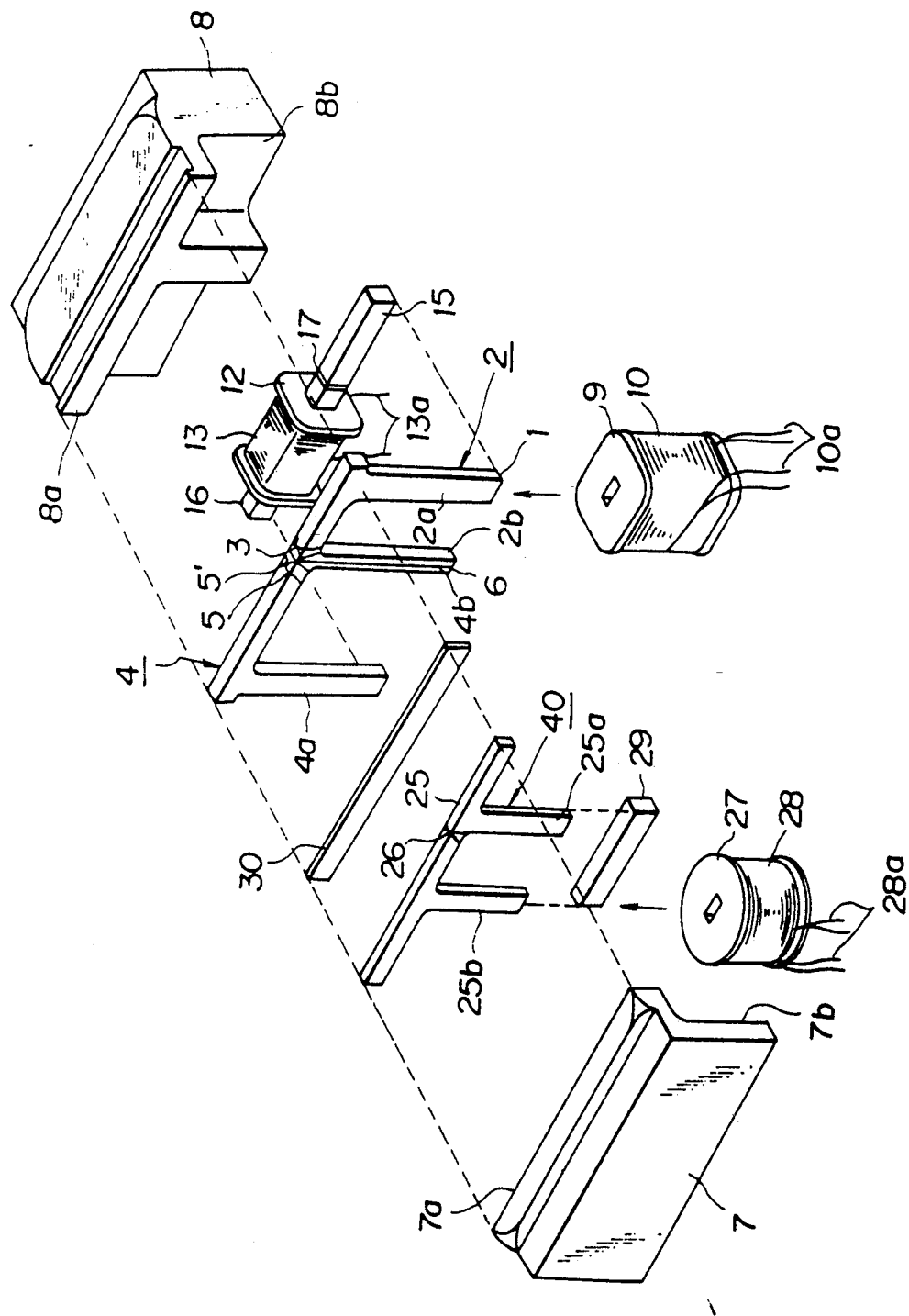
FIG. 5 is an exploded perspective view showing the construction of a conventional composite type magnetic head main body for floppy disk drives.
Figure 6:
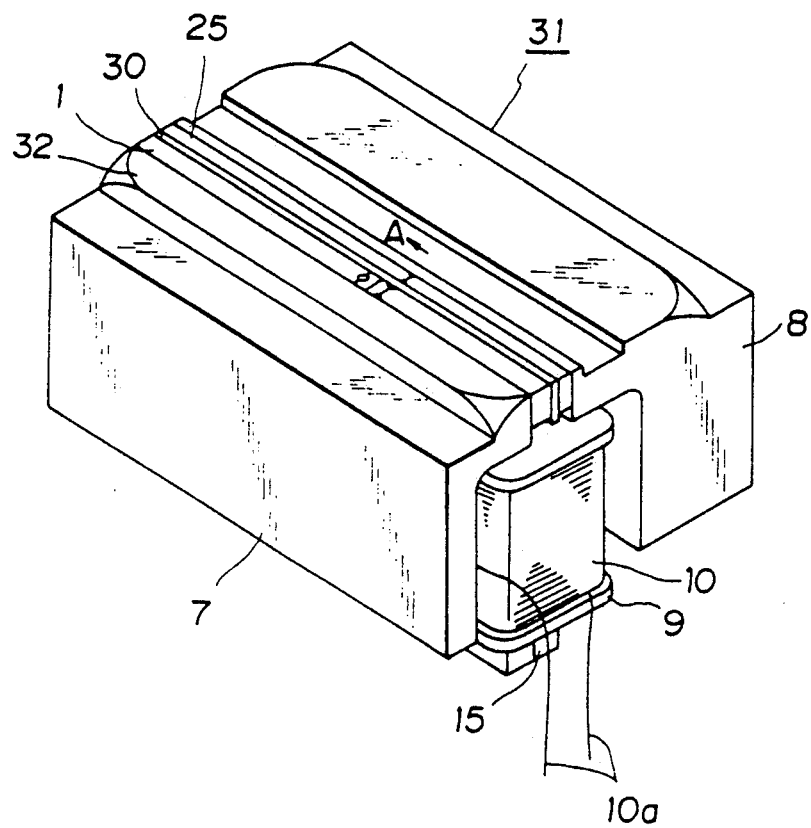
FIG. 6 is a perspective view showing the appearance of the conventional composite type magnetic head main body.
Figure 7:
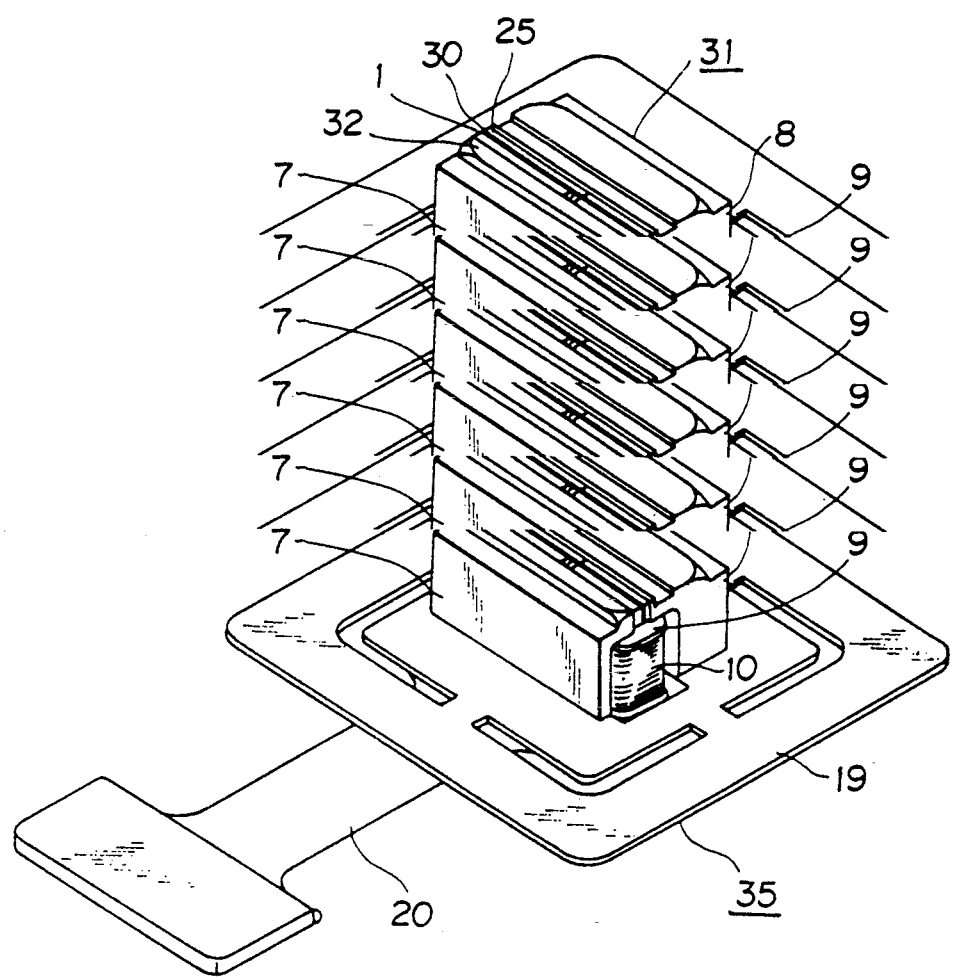
FIG. 7 is a perspective view showing the entire appearance of the magnetic head.

The assembly of the magnetic head main body can be carried out as shown in FIGS. 8 and 9 in a manner similar to that of the conventional magnetic head main body as shown in FIGS. 5 and 6. As clearly seen from FIG. 8, since those portions which are sandwiched by junction surfaces 7a and 8a of the sliders 7 and 8, and are unnecessary for forming the magnetic circuit of the front core assembly 65 are made from the nonmagnetic material (spacers) 51a and 51b, the crosstalk induced between the front core assemblies 1 and 65 can be reduced.

More specifically, the core that forms the front core assembly 65 is arranged by joining a T-shaped core 50a and an L-shaped core 50b via the magnetic gap 26. Let us refer to the top portion of the cores 50a and 50b that slides on the surface of a magnetic recording medium as "a beam member", and the vertical portions to which the back core 29 is to be joined as "leg members". Then the portions of the beam member except the central portion including the magnetic gap 26, that is, portions corresponding to the nonmagnetic spacers 51a and 51b, are unnecessary for forming the magnetic circuit. Accordingly, those portions outside the leg members can be formed by the nonmagnetic material spacers 51a and 51b without deteriorating the electromagnetic conversion characteristics.

As shown in FIG. 9, a disk sliding surface 32 of a magnetic head main body 70 is filled with the nonmagnetic material spacers 51a and 51b, and hence when the disk sliding surface 32 slides on a floppy disk, the sliding will do no harm to these surfaces, thereby maintaining smooth sliding.

EMBODIMENT 2

FIGS. 11A-11H are perspective views showing the steps for manufacturing the front core assembly 65 of FIGS. 8 and 9 as a second embodiment of the present invention.

First, reference numerals 56 and 57 denote magnetic material pieces, materials for a plurality of front cores 50a and 50b of the front core assembly 65, which are formed as rectangular blocks made from a high-permeability magnetic material such as ferrite.

Figure 11A:
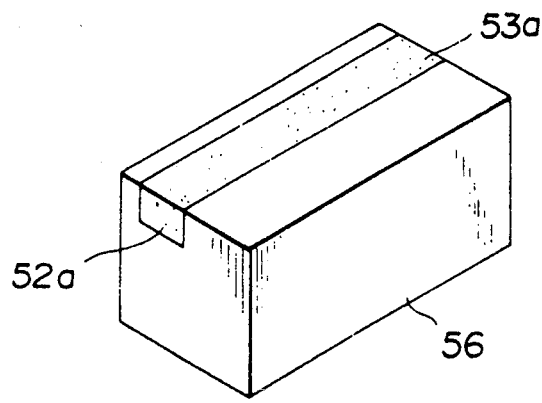
FIGS. 11A-11H are perspective views showing the steps for manufacturing the front core assembly 65 of FIGS. 8 and 9 as a second embodiment of the present invention.
Figure 11B:
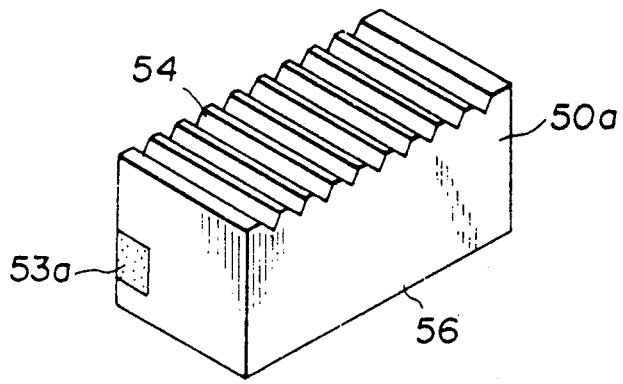
Figure 11C:
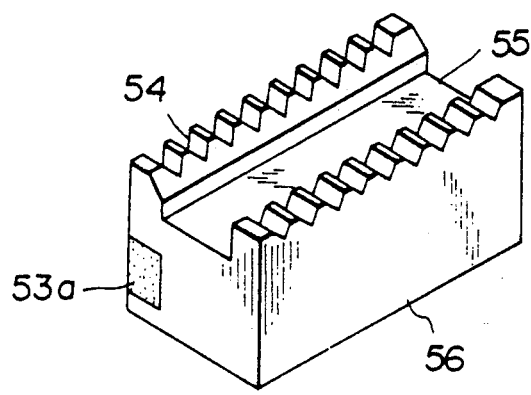
Figure 11D:
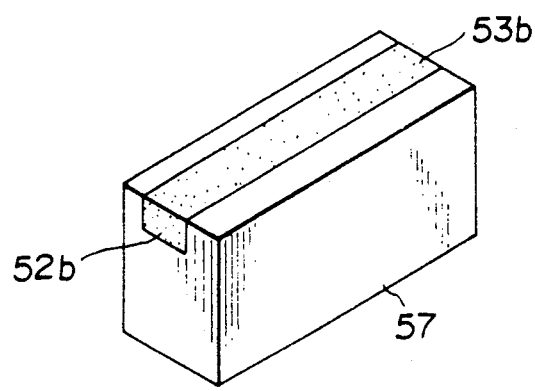

In the fabrication process of the second embodiment, rectangular, straight grooves 52a and 52b are formed in the top surfaces of the magnetic material pieces 56 and 57 in FIGS. 11A and 11D, which will become the disk sliding surface of the front cores 50a and 50b. Into these grooves 52a and 52b, are embedded nonmagnetic materials 53a and 53b made of glasses, ceramics or the like, so as form the spacers 51a and 51b. In practice, when a glass is used, it is embedded by melting, whereas when ceramic is used, it is formed in conformity with the grooves 52a and 52b, and then is fastened therein by adhesives.

Figure 11E:
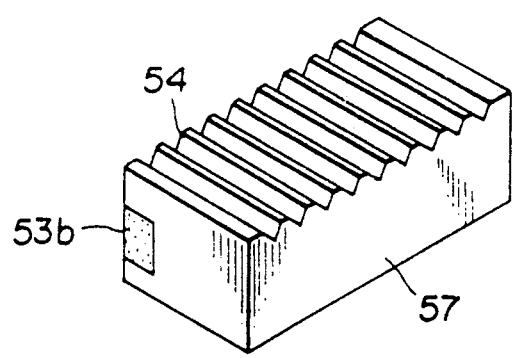

Next, a plurality of track grooves 54, which define the track width of the recording and reproducing gap 26, are formed on the butt surfaces of the magnetic material pieces 56 and 57 with a predetermined space apart as shown in FIGS. 11B and 11E.

After that, as shown in FIG. 11C, a winding groove 55 perpendicular to the track grooves 54 is formed on the surface of the magnetic material piece 56. The winding groove 55 is formed to provide a space for mounting the coil bobbin 27 of FIG. 8 on the front core 50a, that is, for providing the coil 28 with the space for mounting it.

Next, by using a thin film formation technique such as sputtering or vapor deposition, films of predetermined thicknesses which are made from a high saturation flux density material such as Fe-Al-Si alloys are formed on the butt surfaces of the magnetic material pieces 56 and 57 as needed, that is, on the surfaces on which grooves have been formed. Subsequently, nonmagnetic thin films made from a nonmagnetic material such as SiO₂ and CrO₂ are formed on the previously formed films to form the recording and reproducing gap 26.

Figure 11F:
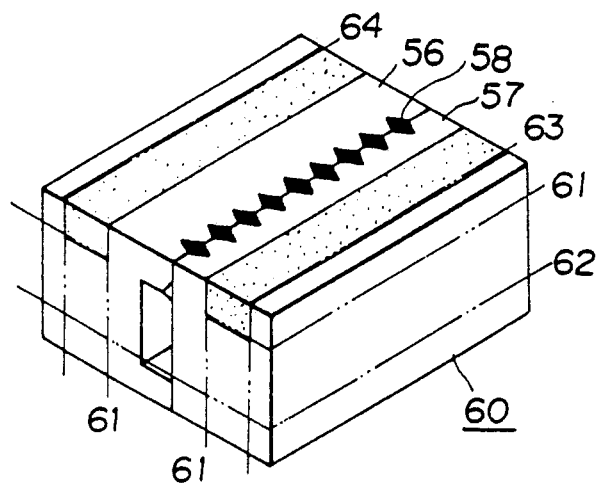

After that, the magnetic material pieces 56 and 57 are butted as shown in FIG. 11F with the track grooves aligned, and are joined together by a joint material 58 whose melting point is lower than that of the nonmagnetic material 53a and 53b, thereby forming a core block 60.

Figure 11G:
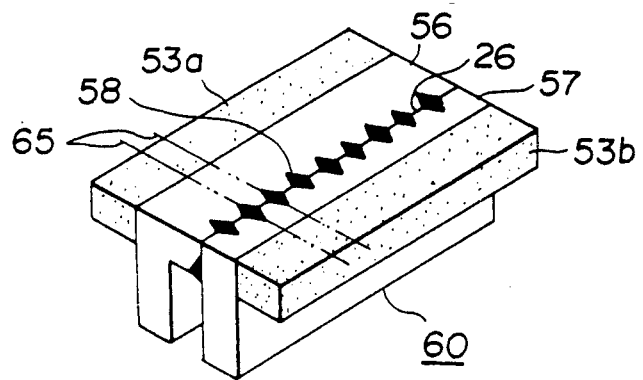
Figure 11H:
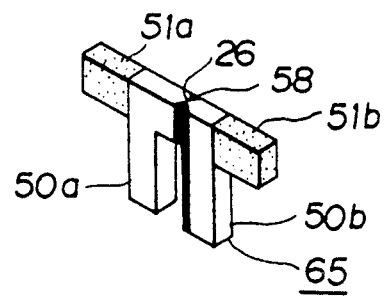

Then, the core block 60 is cut along cutting lines 61, 62, 63 and 64 to a shape shown in FIG. 11G, and finally, it is cut along cutting lines 65, and undergoes lapping so as to form individual front core assemblies 65 as shown in FIG. 11H.

The front core assembly 65 thus formed is assembled with the other parts in FIG. 8 to a magnetic head body 70 in FIG. 9 through steps similar to those of the conventional magnetic head main body. Subsequently, the magnetic head main body 70 is fixed to the support plate 19, and then to the flexible printed board 20 in FIG. 7 through steps similar to those of the conventional magnetic head. Thus, the magnetic head of the present embodiment is completed.

In the magnetic head thus fabricated, the front cores 50a and 50b of the front core assembly 65 include unnecessary portions to form a ring-shaped magnetic circuit which is formed by inner portions of the front cores 50a and 50b and the back core 29: they are the outer portions of the front cores 50a and 50b that protrude at the top of the front core assembly 65 to both sides thereof as shown in FIG. 8, which correspond to the nonmagnetic spacers 51a and 51b. The spacers 51a and 51b prevent the flux leakage from being generated or picked up, and hence the crosstalk induced between the front core assemblies 1 and 65 can be reduced, thereby increasing the recording and reproducing effect. In addition, as shown in FIG. 9, a disk sliding surface 32 of the magnetic head main body 70 is completely filled with the spacers 51a and 51b, and hence smooth sliding of the disk sliding surface 32 is achieved on a floppy disk. Thus, the sliding will do no harm to these surfaces.

Furthermore, according to the fabrication process of the front core assembly 65, a so-called multiple fabrication is possible wherein a number of front core assemblies can be produced at the same time from the magnetic material pieces 56 and 57. This will increase the productivity, and hence high performance composite type magnetic heads for floppy disk drives that can prevent crosstalk can be manufactured at a low cost.

EMBODIMENT 3

FIGS. 12A-12H are perspective views illustrating the manufacturing process of the front core assembly 65 according to a third embodiment of the present invention.

Figure 12A:
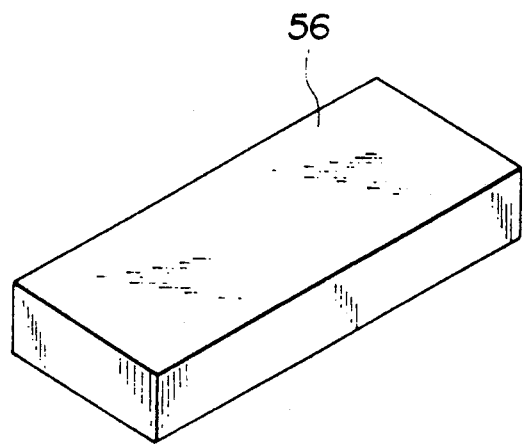
FIGS. 12A-12H are perspective views illustrating the manufacturing process of the front core assembly 65 according to a third embodiment of the present invention.
Figure 12B:
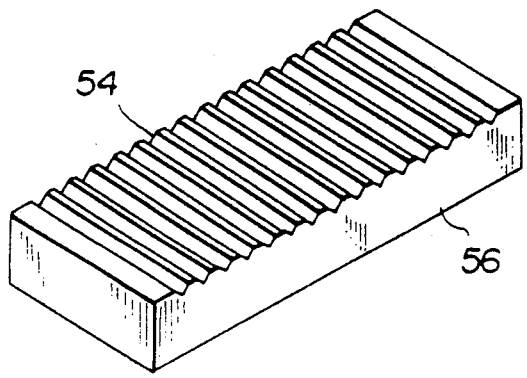
Figure 12C:
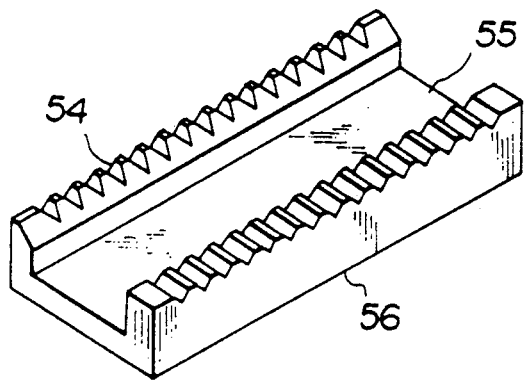
Figure 12D:
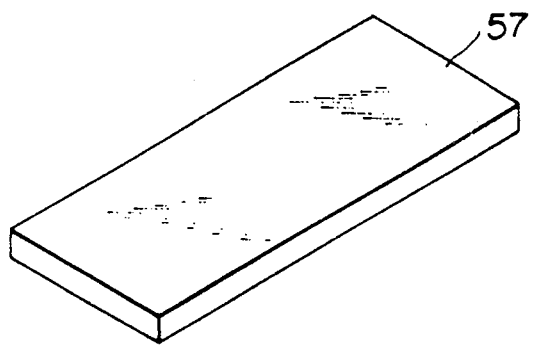
Figure 12E:
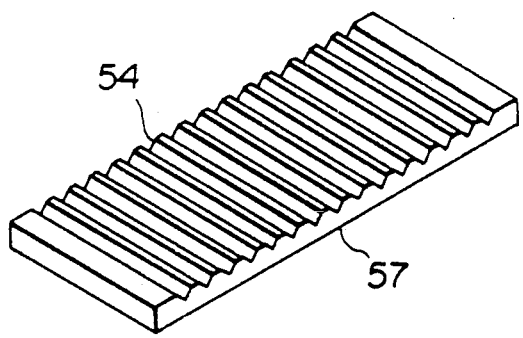
Figure 12F:
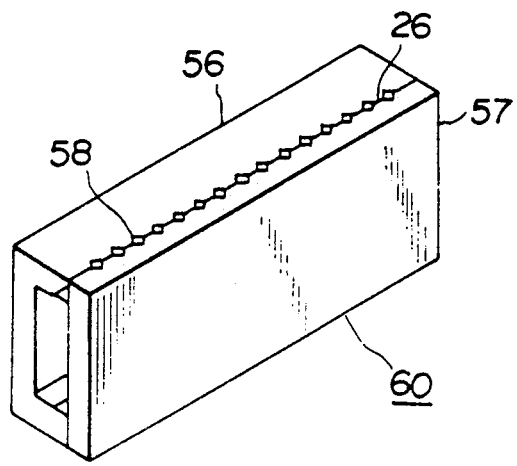

Magnetic material pieces 56 and 57 shown in FIGS. 12A and 12D are materials for constructing the front cores 50a and 50b described above. In this embodiment, however, they are formed into plate-shaped pieces instead of block-shaped magnetic material pieces 56 and 57 of the second embodiment. As shown in FIGS. 12B and 12E, track grooves 54 are formed on the butt surfaces of the magnetic material pieces 56 and 57, and then a winding groove 55 is formed on the magnetic material piece 56 as shown in FIG. 12C. Next, as in the second embodiment, films of predetermined thicknesses which are made from a high saturation flux density material are formed on the butt surfaces of the magnetic material pieces 56 and 57 as needed. Subsequently, nonmagnetic thin films made from a nonmagnetic material are formed on the previously formed films to form the recording and reproducing gap 26. Then, the magnetic material pieces 56 and 57 are butted as shown in FIG. 12F, and are joined together by welding of glass 58 or the like, thereby forming a core block 60.

Figure 12G:
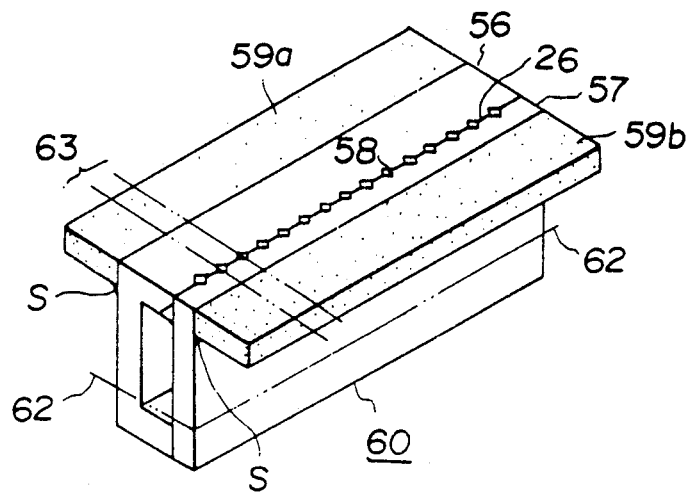

After that, as shown in FIG. 12G, nonmagnetic material pieces 59a and 59b are bonded with an adhesives on both outer sides of the magnetic material pieces 56 and 57 opposite the butt surfaces thereof. The nonmagnetic material pieces 59a and 59b are made from ceramics or nonmagnetic ferrite and are shaped into rectangular plates, from which a plurality of the spacers 51a and 51b are made.

Figure 12H:
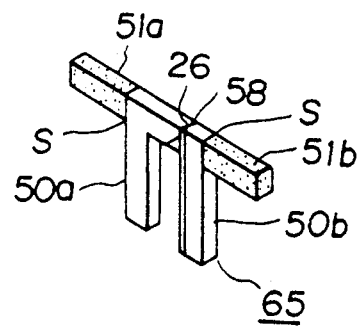

Next, the assembly of the core block 60 and the nonmagnetic material pieces 59a and 59b is cut along cutting lines 62 and 63 and undergoes lapping to form a shape shown in FIG. 12H. Thus, a plurality of front core assemblies 65 are produced.

According to the steps described above, the multiple fabrication of the front core assembly 65 is possible as in the second embodiment. This will increase the productivity, and hence the composite type magnetic head for floppy disk drives that can prevent crosstalk can be manufactured at a low cost.

In the above step of FIG. 12G, it becomes necessary to carry out the lapping to the assembly of the core block 60 and the nonmagnetic material pieces 59a and 59b because the adhesive S protrudes above the top surface or the disk sliding surface, which must be removed before cutting.

Figure 13A:
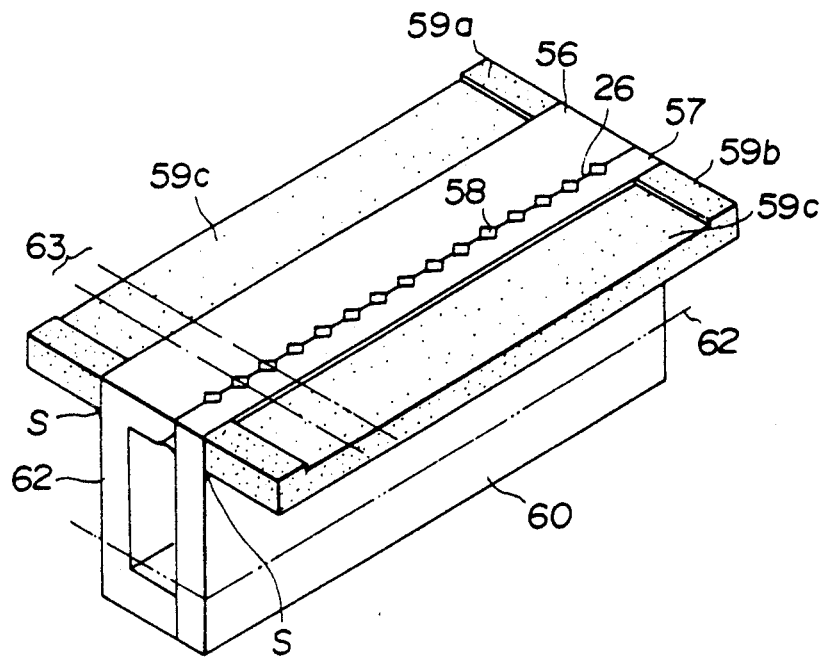
FIGS. 13A and 13B are perspective views showing an example in which a method for manufacturing a magnetic head of the third embodiment is partly modified.
Figure 13B:
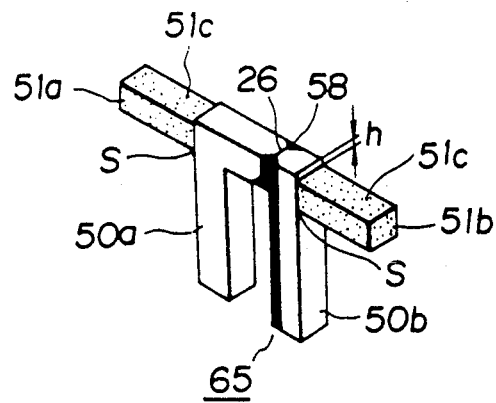

To eliminate the lapping, each of the nonmagnetic material pieces 59a and 59b may be provided on its surface with a very shallow groove 59c of about 0.05-0.5 mm depth. In this case, as shown in FIG. 13B, the front core assembly 65 obtained by cutting the assembly of the core block 60 and nonmagnetic magnetic pieces 59a and 59b has shallow notches h between the top surfaces (the disk sliding surface) of the front cores 50a and 50b, and the top surfaces of the spacers 51a and 51b. The notches can eliminate the protrusions of the adhesive S.

Figure 14:
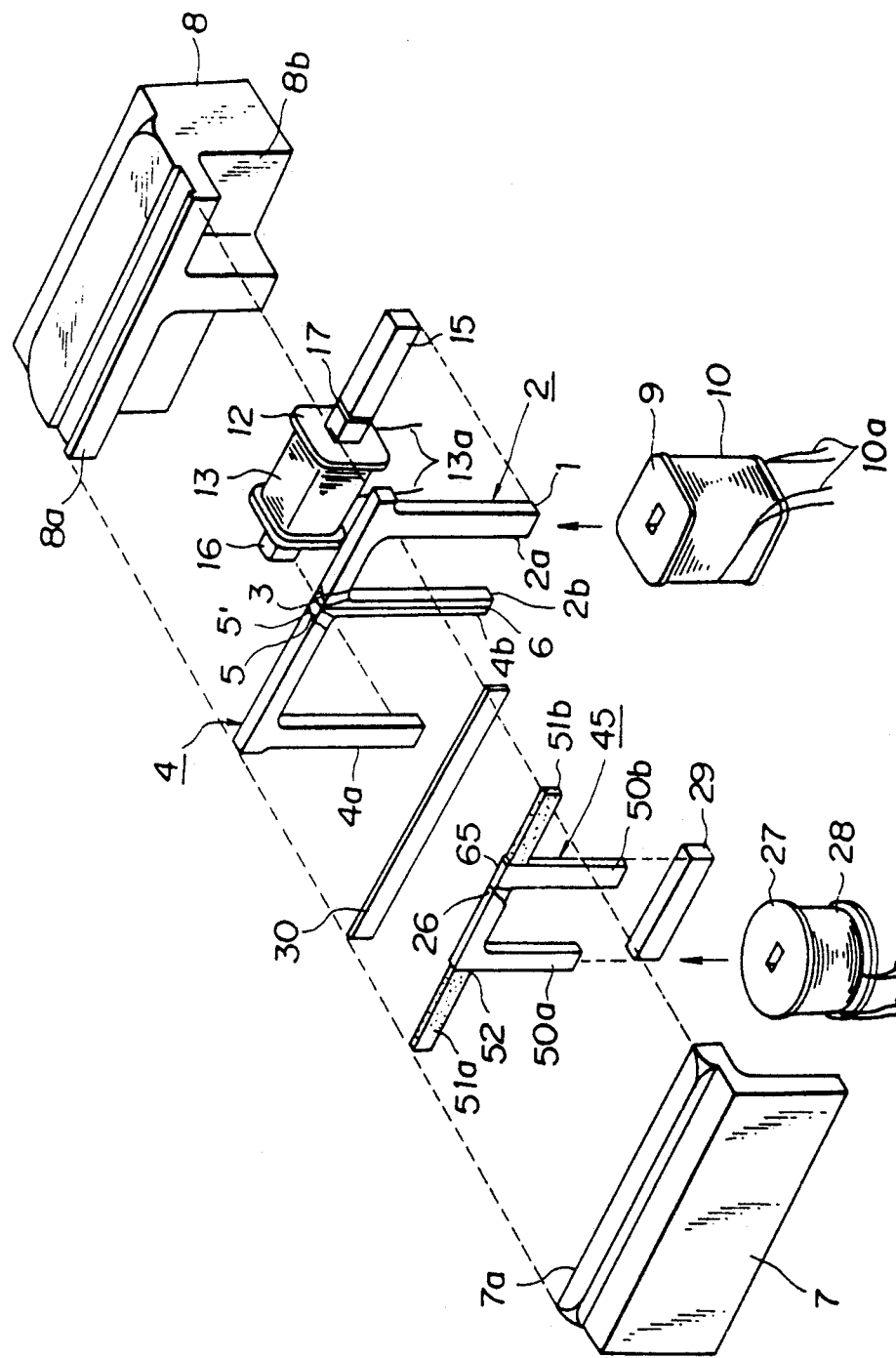
FIG. 14 is an exploded perspective view showing the construction of the composite type magnetic head main body for floppy disk drives fabricated by the modified method of the third embodiment of the present invention.

When the front core assembly 65 of FIG. 13B is assembled with the other parts as shown in FIG. 14 to construct a magnetic head main body, notches h will form shallow grooves on the disk sliding surface at the surfaces of the spacers 51a and 51b. These grooves can be eliminated by adjusting the dimensions of finishing of the disk sliding surface. Alternatively, the grooves may be left so as to induce air flow on the disk to lessen the contact pressure during sliding, or may be used as air inlet grooves for preventing dust.

The present invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A magnetic head comprising:

a pair of core assemblies, each having at least one magnetic core which forms at least part of a magnetic circuit having a magnetic gap;

a spacer plate sandwiched between said pair of core assemblies, said pair of core assemblies being juxtaposed in a lengthwise direction of said magnetic gap; and a sliding surface on which a magnetic recording medium slides, said sliding surface including the magnetic gap of each of said pair of core assemblies;

wherein at least one of said magnetic core assemblies comprises at least one nonmagnetic spacer member disposed outside the magnetic circuit thereof and forming a pair of said sliding surface.

2. A magnetic head as claimed in claim 1, wherein at least one of said magnetic core assemblies comprises a pair of first cores having said magnetic gap therebetween and a second core, and wherein said first cores comprise beam members including said sliding surface and leg members to which said second core is joined to form said magnetic circuit, said nonmagnetic spacer members extending from said beam members.

3. A magnetic head as claimed in claim 2, wherein thin notches are formed on said nonmagnetic spacer members, said nonmagnetic spacer members being spaced from said magnetic medium when said magnetic head slides on said magnetic recording medium.

4. A magnetic head comprising:

a pair of core assemblies, each core assembly including at least one magnetic core which forms at least part of a magnetic circuit having a magnetic gap, said magnetic gap of each magnetic circuit enabling recording and reproducing of data to and from a recording medium;

a spacer plate sandwiched between said pair of core assemblies; and a sliding surface on which a magnetic recording medium slides, said sliding surface including the magnetic gap of each of said pair of core assemblies;

wherein at least one of said magnetic core assemblies comprises at least one nonmagnetic spacer member disposed outside said magnetic circuit and forming a part of said sliding surface.

* * * * *